(12) United States Patent
Sappenfield et al.

(10) Patent No.: US 12,144,698 B2
(45) Date of Patent: Nov. 19, 2024

(54) DENTAL DEVICES AND RELATED METHODS

(71) Applicant: Christopher C. Sappenfield, Goodyear, AZ (US)

(72) Inventors: Christopher C. Sappenfield, Goodyear, AZ (US); Jinky E. Sacaguing, Granada Hills, CA (US)

( * ) Notice: Subject to any disclaimer, the term of this patent is extended or adjusted under 35 U.S.C. 154(b) by 284 days.

(21) Appl. No.: 17/712,114

(22) Filed: Apr. 2, 2022

(65) Prior Publication Data
US 2022/0323177 A1    Oct. 13, 2022

Related U.S. Application Data

(60) Provisional application No. 63/172,077, filed on Apr. 7, 2021.

(51) Int. Cl.
*A61C 3/16* (2006.01)

(52) U.S. Cl.
CPC .................... *A61C 3/162* (2013.01)

(58) Field of Classification Search
CPC .. A61C 3/14; A61C 3/16; A61C 3/162; A61C 7/02; B25B 7/00; B25B 7/02; B25B 7/06; B25B 7/08
USPC ....................................................... 433/141
See application file for complete search history.

(56) References Cited

U.S. PATENT DOCUMENTS

| | | | | |
|---|---|---|---|---|
| 1,707,947 A | * | 4/1929 | Zettervall | B25B 27/08 81/DIG. 6 |
| 2,595,683 A | * | 5/1952 | Lo Monte | B25B 9/02 294/99.2 |
| 3,191,304 A | * | 6/1965 | Mattern | A61C 5/85 132/277 |
| 3,507,043 A | * | 4/1970 | Rubin | A61C 7/04 433/157 |
| 4,001,940 A | * | 1/1977 | Cusato | A61C 7/04 29/229 |
| 4,310,305 A | * | 1/1982 | Frajdenrajch | A61C 7/04 433/155 |
| 5,339,712 A | * | 8/1994 | Keyvani | A61C 3/14 606/205 |
| 5,833,460 A | | 11/1998 | Maeda | |
| 5,904,482 A | * | 5/1999 | Long | A61C 3/14 D24/152 |
| 6,210,161 B1 | * | 4/2001 | Montgomery | A61C 3/14 433/146 |
| 6,394,805 B1 | | 5/2002 | Rabal | |
| 6,923,647 B2 | | 8/2005 | Gould et al. | |
| 8,152,834 B2 | * | 4/2012 | McGarity | A61B 17/282 606/205 |
| 8,317,513 B1 | * | 11/2012 | Cannon | A61C 19/004 433/29 |
| D890,342 S | * | 7/2020 | Mazzeo | D24/153 |
| 2004/0152044 A1 | * | 8/2004 | Khan-Sullman | A61B 17/2841 433/159 |

(Continued)

FOREIGN PATENT DOCUMENTS

| | | | | |
|---|---|---|---|---|
| CN | 110638534 A | * | 1/2020 | A61C 3/14 |

*Primary Examiner* — Matthew M Nelson

(74) *Attorney, Agent, or Firm* — Christopher C. Sappenfield

(57) ABSTRACT

Provided herein are handheld dental devices useful in performing a wide variety of dental procedures, including crown removal applications. Related methods of administering dental therapy to patients' are also provided.

19 Claims, 7 Drawing Sheets

(56) References Cited

U.S. PATENT DOCUMENTS

| | | | |
|---|---|---|---|
| 2005/0214719 A1* | 9/2005 | Hermann | A61C 3/14 433/215 |
| 2005/0260538 A1* | 11/2005 | Muller | A61C 3/16 433/159 |
| 2006/0228670 A1* | 10/2006 | Zepf | A61C 3/14 433/159 |
| 2010/0047740 A1 | 2/2010 | Fyffe | |
| 2015/0056565 A1* | 2/2015 | Kim | A61C 7/02 433/3 |
| 2015/0223912 A1* | 8/2015 | Munce | A61C 8/0089 433/221 |
| 2019/0210142 A1* | 7/2019 | Catoe | B08B 9/0436 |
| 2019/0262099 A1* | 8/2019 | Lahti | B25B 7/08 |
| 2020/0275990 A1* | 9/2020 | Nishio | A61C 3/14 |
| 2020/0397533 A1* | 12/2020 | Liu | A61C 3/14 |
| 2021/0172698 A1* | 6/2021 | Buchanan | F41B 5/12 |

* cited by examiner

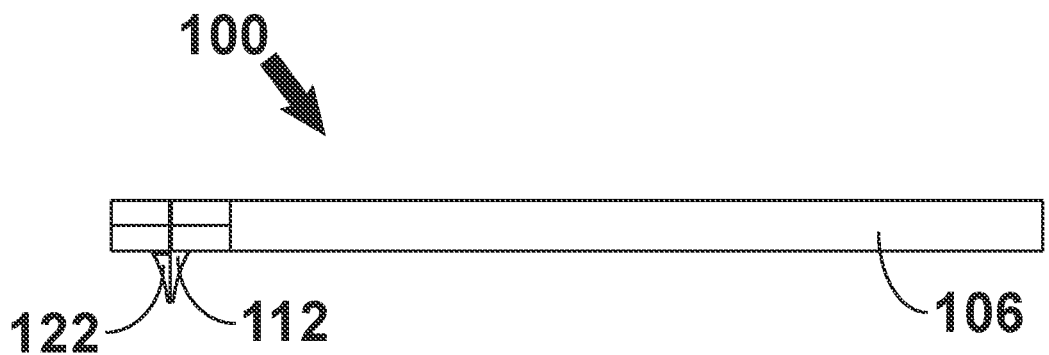
FIG. 1A
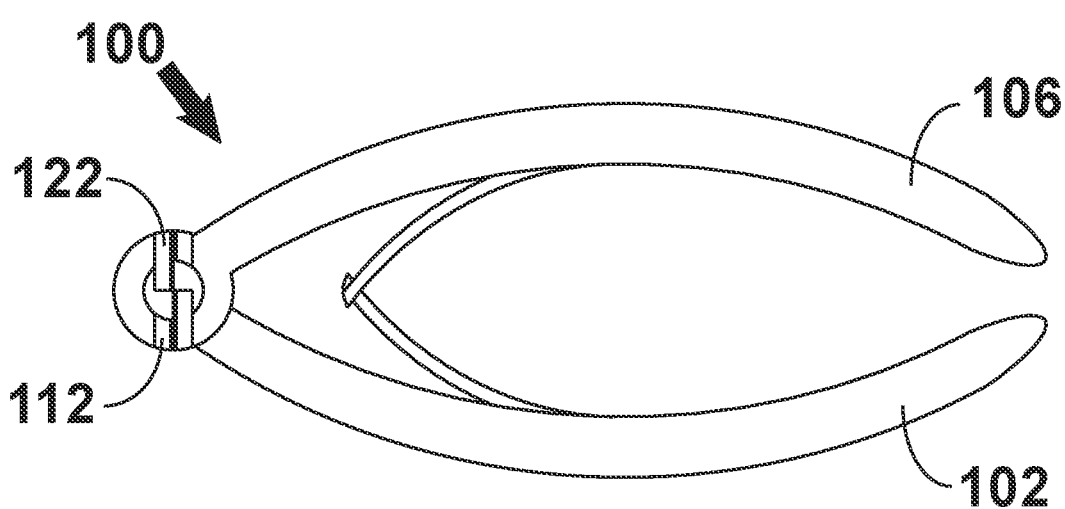
FIG. 1B
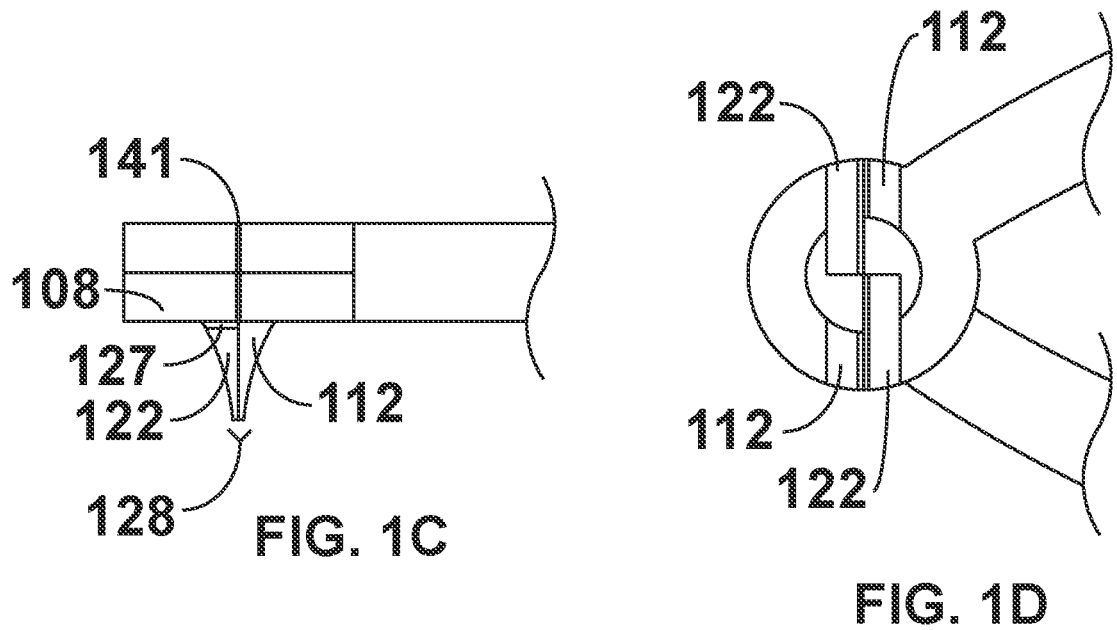
FIG. 1C
FIG. 1D

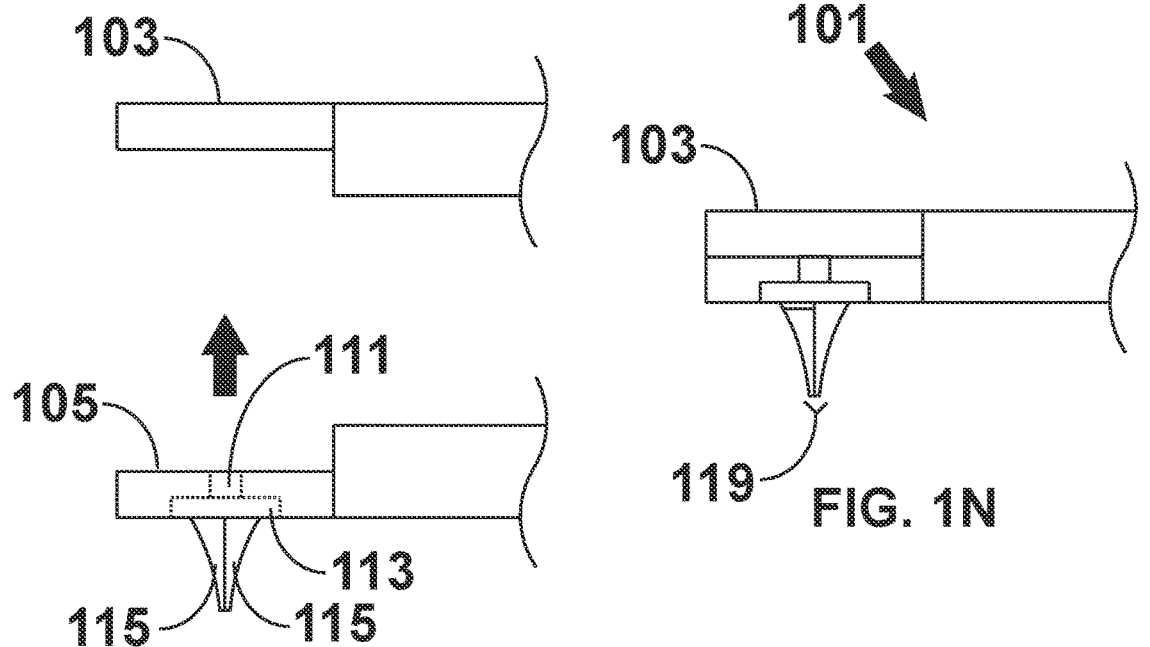
FIG. 1N
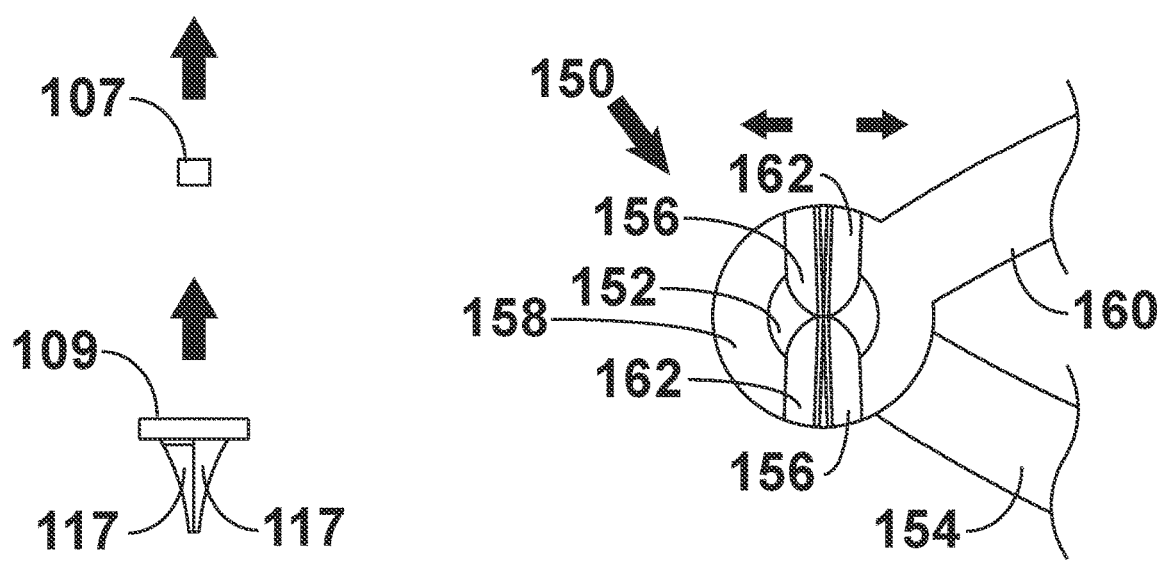
FIG. 1M
FIG. 1O

DENTAL DEVICES AND RELATED METHODS

CROSS-REFERENCE TO RELATED APPLICATIONS

This application claims priority to U.S. Provisional Patent Application Ser. No. 63/172,077, filed Apr. 7, 2021, the disclosure of which is incorporated herein by reference.

BACKGROUND

Numerous dental procedures utilize assorted tools or other devices to manipulate at least portions of patients' teeth, whether those teeth are natural or prosthetic, such as veneers, crowns, bridges, or dentures. In certain applications, for example, a damaged crown may need to be replaced with a new one. Crowns are frequently cemented or otherwise bonded in position over a reshaped natural tooth or an abutment of a dental implant. Crowns are fabricated from various restorative materials, including metals (e.g., titanium, gold, nickel, and palladium, among others), porcelain fused to metal, resin, ceramics (e.g., zirconium dioxide ($ZrO_2$) or zirconia), and the like. In some cases, the restorative material may need to be at least partially cut through with high-speed rotary instrument and then pried off using a dental crown removal instrument. Oftentimes, crown removal using these pre-existing instruments is a physically demanding and difficult process for dental care providers and an uncomfortable procedure for patients to endure.

Accordingly, there is a need for additional dental devices and related methods for removing or otherwise manipulating patients' teeth as part of a given dental procedure.

SUMMARY

The present disclosure relates, in certain aspects, to handheld dental devices useful in a wide variety of dental procedures, including crown removal applications. Related methods of administering dental therapy to patients' are also provided.

In certain aspects, the present disclosure provides a handheld dental device that includes a first handle structure comprising a first rotational section, and a second handle structure comprising a second rotational section that comprises at least one orifice disposed through at least a portion of the second rotational section and one or more second projection elements that extend from at least one surface of the second rotational section. The handheld dental device also includes a post element disposed through the orifice of the second rotational section of the second handle structure, wherein at least a first portion of the post element is operably connected to the first rotational section of the first handle structure such that the post element and the first handle structure are substantially fixedly positioned and substantially non-rotatable relative to one another. The handheld dental device also includes a rotational structure comprising one or more first projection elements that extend from at least one surface of the rotational structure, wherein at least a second portion of the post element is operably connected to the rotational structure such that the post element, the rotational structure, and the first handle structure are substantially fixedly positioned and substantially non-rotatable relative to one another. In this embodiment of the handheld dental device, at least a segment of the second rotational section of the second handle structure is disposed between at least a segment of the first rotational section of the first handle structure and at least a segment of the rotational structure such that the second handle structure is at least partially rotatable relative to the post element, the rotational structure, and the first handle structure. In this embodiment of the handheld dental device, the first and second projection elements together form at least one projection element pair, wherein at least a portion of the projection element pair is dimensioned to fit at least partially within an opening disposed in or between one or more natural and/or prosthetic teeth in a mouth of a given subject when the projection element pair is in a closed position and when the projection element pair is positioned at least partially in the opening disposed in or between the one or more natural and/or prosthetic teeth in the mouth of the given subject. In this embodiment of the handheld dental device, when the first and second handle structures are moved toward one another, the first and second projection elements of the projection element pair move away from one another in directions that are substantially perpendicular to a rotational axis of the first and second handle structures such that at least segments of the projection element pair contact the one or more natural and/or prosthetic teeth in the mouth of the given subject when the projection element pair is positioned at least partially in the opening disposed in or between the one or more natural and/or prosthetic teeth in the mouth of the given subject. In this embodiment of the handheld dental device, at least a portion of the handheld dental device is dimensioned to at least partially fit within the mouth of the given subject.

In certain aspects, the present disclosure provides a handheld dental device that includes a first handle structure comprising a first rotational section and at least one operably connected first projection element, and a second handle structure comprising a second rotational section and at least one operably connected second projection element. In this embodiment of the handheld dental device, the first and second rotational sections are rotatably coupled to one another, and the first and second projection elements together form at least one projection element pair, wherein at least a portion of the projection element pair is dimensioned to fit at least partially within an opening disposed in or between one or more natural and/or prosthetic teeth in a mouth of a given subject when the projection element pair is in a closed position and when the projection element pair is positioned at least partially in the opening disposed in or between the one or more natural and/or prosthetic teeth in the mouth of the given subject. In this embodiment of the handheld dental device, when the first and second handle structures are moved toward one another, the first and second projection elements of the projection element pair move away from one another in directions that are substantially perpendicular to a rotational axis of the first and second handle structures such that at least segments of the projection element pair contact the one or more natural and/or prosthetic teeth in the mouth of the given subject when the projection element pair is positioned at least partially in the opening disposed in or between the one or more natural and/or prosthetic teeth in the mouth of the given subject. In this embodiment of the handheld dental device, at least a portion of the handheld dental device is dimensioned to at least partially fit within the mouth of the given subject.

In some embodiments of the handheld dental devices disclosed herein, the first rotational section of the first handle structure comprises at least one orifice disposed through at least a portion of the first rotational section, which orifice receives the first portion of the post element. In some of these embodiments, the first rotational section of the first handle structure comprises at least one post element receiving area that is configured to receive at least the first portion of the post element and/or a modification of the first portion of the post element upon assembly of the handheld dental device. In some of these embodiments, the first rotational section of the first handle structure comprises at least one fixation element receiving area. In some embodiments of the handheld dental devices disclosed herein, the second rotational section of the second handle structure comprises at least one rotational structure receiving area that receives at least a portion of the rotational structure upon assembly of the handheld dental device. In some embodiments of the handheld dental devices disclosed herein, the second rotational section of the second handle structure comprises at least one fixation element pass-through area. In some of these embodiments, the post element comprises at least one fixation element that is passed through the fixation element pass-through area of the second rotational section of the second handle structure and at least partially into the fixation element receiving area of the first rotational section of the first handle structure during assembly of the handheld dental device such that the post element and the first handle structure are substantially fixedly positioned and substantially non-rotatable relative to one another.

In some embodiments of the handheld dental devices disclosed herein, the post element and the first rotational section of the first handle structure are fabricated integral with one another. In some embodiments of the handheld dental devices disclosed herein, the post element and the rotational structure are fabricated integral with one another. In some embodiments, the handheld dental devices disclosed herein include at least two projection element pairs, whereas in other embodiments, the handheld dental devices include at least three projection element pairs. In some embodiments of the handheld dental devices disclosed herein, at least one of the first and second projection elements of the projection element pair comprises at least one gripping element that is structured to at least partially grip the one or more natural and/or prosthetic teeth in the mouth of the given subject when the segments of the projection element pair contact the one or more natural and/or prosthetic teeth in the mouth of the given subject. In some embodiments of the handheld dental devices disclosed herein, one or more portions of at least one of the first and second projection elements of the projection element pair extend over, and comprises clearance from, portions of one or more surfaces of the first and/or second rotational sections.

In some embodiments of the handheld dental devices disclosed herein, at least a part of at least one of the first and second projection elements of the projection element pair comprises at least one cross-sectional shape selected from the group consisting of: a circle, an ellipse, an oval, a square, a rectangle, a trapezoid, a triangle, an irregular n-sided polygon, and a regular n-sided polygon. In some embodiments of the handheld dental devices disclosed herein, at least a part of the first and second rotational sections together comprises at least one cross-sectional shape selected from the group consisting of: a circle, an ellipse, an oval, a square, a rectangle, a trapezoid, a triangle, an irregular n-sided polygon, and a regular n-sided polygon.

In some embodiments of the handheld dental devices disclosed herein, the first and/or second rotational section comprises at least one position indicator element that is structured to indicate a position of the projection element pair at least when the projection element pair is at least partially disposed within the mouth of the given subject. In some embodiments, the handheld dental devices disclosed herein include at least one resiliency element operably connected to the first and/or second handle structure, which resiliency element is structured to position the projection element pair in the closed position at least when the handheld dental device is not in use. In some of these embodiments, the resiliency element is further structured to limit a range of motion at least of the first and second projection elements of the projection element pair. In some embodiments, the handheld dental devices disclosed herein include at least one motion limiting element that is structured to limit a range of motion at least of the first and second projection elements of the projection element pair. In some embodiments of the handheld dental devices disclosed herein, the first projection element extends from a side of the first rotational section of the first handle structure and wherein the second projection element extends from a side of the second rotational section of the second handle structure. In some of these embodiments, at least a portion of the projection element pair extends above and/or below a surface of the first and/or second rotational sections.

In other aspects, the present disclosure provides a method of administering dental therapy to a subject. The method includes positioning at least one projection element pair of a handheld dental device at least partially within an opening disposed in or between one or more natural and/or prosthetic teeth in a mouth of the subject, wherein the projection element pair is substantially in a closed position and wherein the handheld dental device comprises: a first handle structure comprising a first rotational section and at least one operably connected first projection element; and a second handle structure comprising a second rotational section and at least one operably connected second projection element, wherein the first and second rotational sections are rotatably coupled to one another, and wherein the first and second projection elements together form the projection element pair. The method also includes moving the first and second handle structures of the handheld dental device toward one another such that the first and second projection elements of the projection element pair move away from one another in directions that are substantially perpendicular to a rotational axis of the first and second handle structures so that at least segments of the projection element pair contact and move at least a portion of at least one of the one or more natural and/or prosthetic teeth in the mouth of the subject, thereby administering the dental therapy to the subject.

BRIEF DESCRIPTION OF THE DRAWINGS

The accompanying drawings, which are incorporated in and constitute a part of this specification, illustrate certain embodiments, and together with the written description, serve to explain certain principles of the handheld dental devices and related methods disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

FIG. 1A schematically shows a handheld dental device in which two projection element pairs (one pair not within view) are in closed positions from a side view according to some aspects disclosed herein.

FIG. 1B schematically shows the handheld dental device from FIG. 1A from a bottom view according to some aspects disclosed herein.

FIG. 1C schematically shows a projection element pair of the handheld dental device from FIG. 1A in a closed position from a detailed side view according to some aspects disclosed herein.

FIG. 1D schematically shows the projection element pairs of the handheld dental device from FIG. 1B in closed positions from a detailed bottom view according to some aspects disclosed herein.

FIG. 1M schematically shows a first rotational section of a first handle structure, a second rotational section of a second handle structure, a post element, and a separate rotational structure of a handheld dental device from a detailed exploded and partially transparent side view prior to device assembly according to some aspects disclosed herein.

FIG. 1N schematically shows the handheld dental device from FIG. 1M from a detailed exploded and partially transparent side view following device assembly according to some aspects disclosed herein.

FIG. 1O schematically shows a portion of a handheld dental device having two projection element pairs from a detailed bottom view according to some aspects disclosed herein.

DEFINITIONS

Figure 1E:
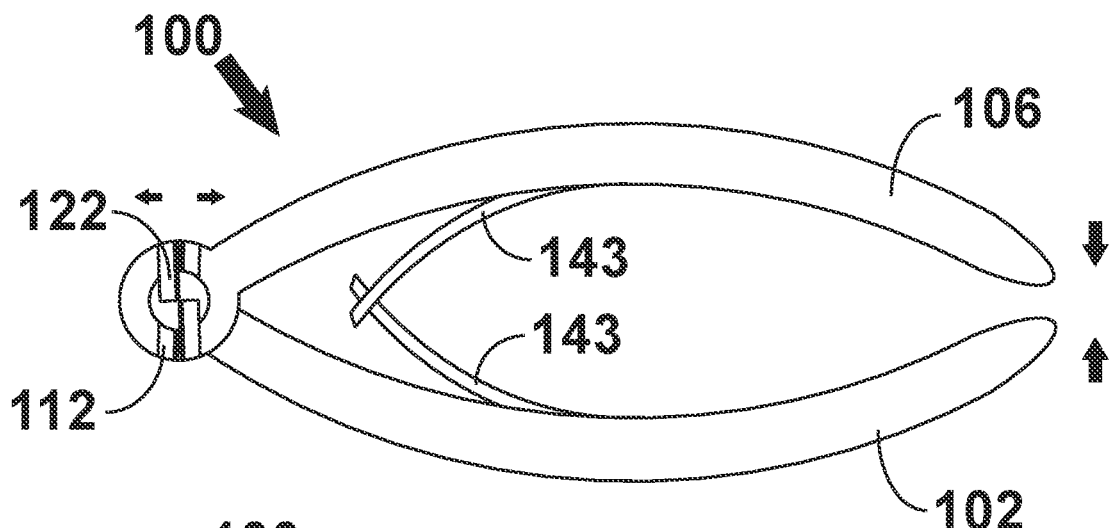
FIG. 1E schematically shows the projection element pairs of the handheld dental device from FIG. 1A in open positions from a bottom view according to some aspects disclosed herein.
Figure 1F:
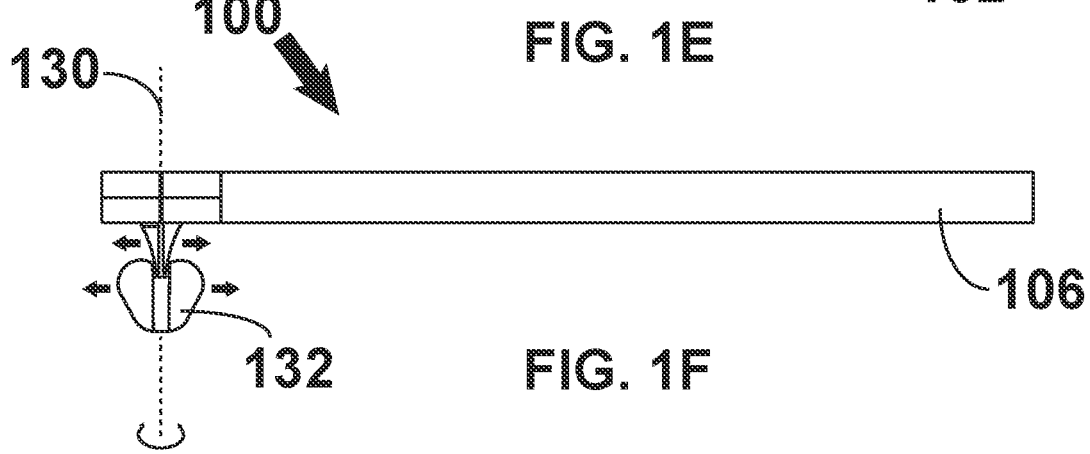
FIG. 1F schematically shows a projection element pair of the handheld dental device from FIG. 1A in an open position and positioned within an opening of a crown from a side view according to some aspects disclosed herein.
Figure 1G:
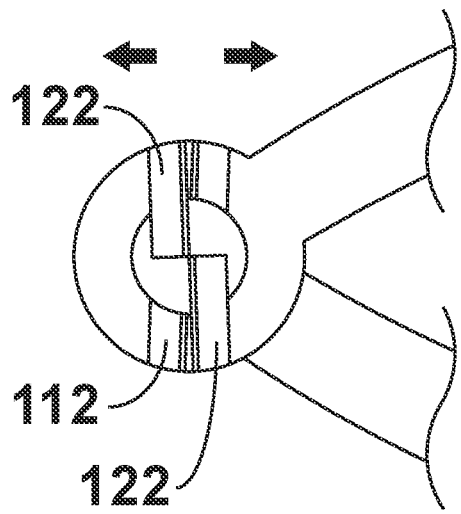
FIG. 1G schematically shows the projection element pairs of the handheld dental device from FIG. 1E in open positions from a detailed bottom view according to some aspects disclosed herein.
Figure 1H:
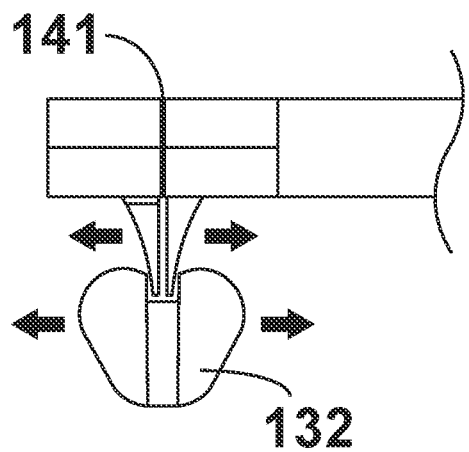
FIG. 1H schematically shows a projection element pair of the handheld dental device from FIG. 1A in an open position and positioned within an opening of a crown from a detailed side view according to some aspects disclosed herein.
Figure 1I:
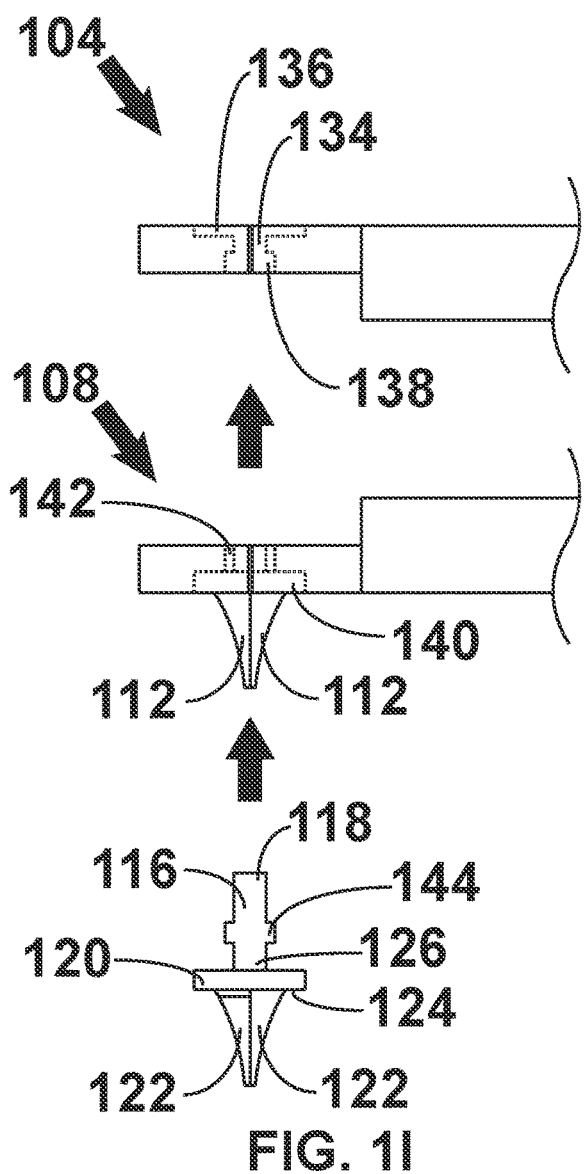
FIG. 1I schematically shows a first rotational section of a first handle structure, a second rotational section of a second handle structure, and a post element fabricated integral with a rotational structure of the handheld dental device from FIG. 1A from a detailed exploded and partially transparent side view prior to device assembly according to some aspects disclosed herein.
Figure 1J:
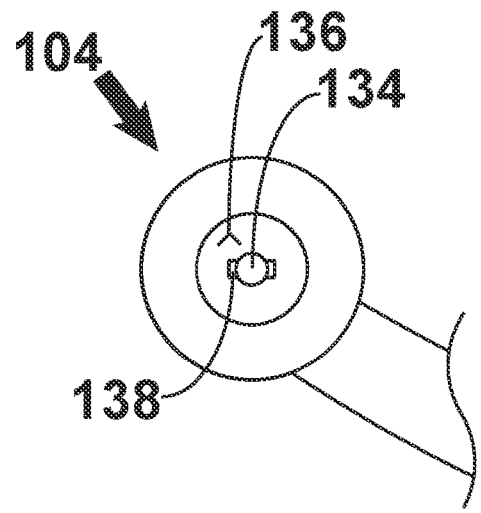
FIG. 1J schematically shows the first rotational section of the first handle structure from FIG. 1I from a detailed bottom view according to some aspects disclosed herein.
Figure 1K:
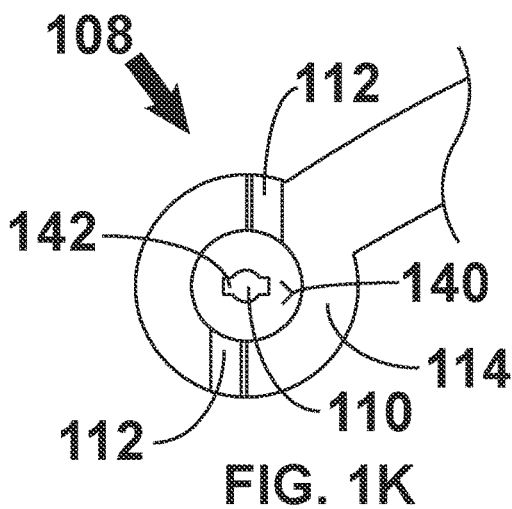
FIG. 1K schematically shows the second rotational section of the second handle structure from FIG. 1I from a detailed bottom view according to some aspects disclosed herein.
Figure 1L:
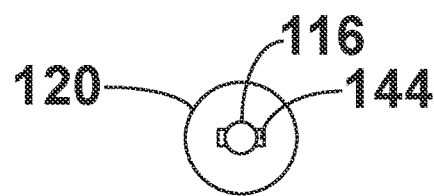
FIG. 1L schematically shows the post element fabricated integral with the rotational structure from FIG. 1I from a detailed top view according to some aspects disclosed herein.

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only and is not intended to be limiting. Further, unless defined otherwise, all technical and scientific terms used herein have the same meaning as commonly understood by one of ordinary skill in the art to which this disclosure pertains. In describing and claiming the methods, devices, and component parts, the following terminology, and grammatical variants thereof, will be used in accordance with the definitions set forth below.

Substantially: As used herein, "substantially" in the context of elements of interest, refers to an element that is, or has a property that is, to a great or significant extent similar to a stated reference element or property thereof. In certain embodiments, the term "substantially" refers to a range of values associated with the element or property thereof that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in one or more directions (greater than or less than) of the stated reference value or element or property thereof unless otherwise stated or otherwise evident from the context (except where such number would exceed 100% of a possible value or element or property thereof). For example, two elements may be "substantially non-rotatable" relative to one another if those elements are capable of rotating no more than 25% in one or more directions relative to one another.

Subject: As used herein, "subject" refers to an animal, such as a mammalian species (e.g., a human or other primate). Other exemplary animals include farm animals (e.g., production cattle, dairy cattle, poultry, horses, pigs, and the like), sport animals, and companion animals (e.g., pets or support animals). The terms "individual" or "patient" are intended to be interchangeable with the term "subject."

DETAILED DESCRIPTION

The present disclosure relates, in certain aspects, to handheld dental devices that are useful in performing a wide array of dental procedures, including dental extractions and crown removal protocols, among others. Related methods of administering dental therapy to subjects using the handheld dental devices of the present disclosure are also provided. These and other aspects will be apparent upon a complete review of the present disclosure, including the accompanying figures.

To illustrate, FIGS. 1A-1L schematically illustrate a handheld dental device or portions thereof from various views according to some aspects of the present disclosure. As shown, handheld dental device 100 includes first handle structure 102 that includes first rotational section 104, and second handle structure 106 that includes second rotational section 108 that comprises orifice 110 disposed through at least a portion of second rotational section 108 and second projection elements 112 that extend from surface 114 of second rotational section 108. Handheld dental device 100 also includes post element 116 disposed through orifice 110 of second rotational section 108 of second handle structure 106 in which first portion 118 of post element 116 is operably connected to first rotational section 104 of first handle structure 102 such that post element 116 and first handle structure 102 are substantially fixedly positioned and substantially non-rotatable relative to one another. Handheld dental device 110 also includes rotational structure 120 comprising first projection elements 122 that extend from surface 124 of rotational structure 120 in which second portion 126 of post element 116 is operably connected to rotational structure 120 such that post element 116, rotational structure 120, and first handle structure 102 are substantially fixedly positioned and substantially non-rotatable relative to one another. As shown, in this embodiment of handheld dental device 100, at least a segment of the second rotational section 108 of second handle structure 106 is disposed between at least a segment of first rotational section 104 of first handle structure 102 and at least a segment of rotational structure 120 such that second handle structure 106 is at least partially rotatable relative to post element 116, rotational structure 120, and first handle structure 102. As also shown, in this embodiment of handheld dental device 100, the first and second projection elements together form at least one projection element pair 128 in which at least a portion of projection element pair 128 is dimensioned to fit at least partially within an opening (see, e.g., FIGS. 1 F and H) disposed in or between one or more natural and/or prosthetic teeth 132 in a mouth of a given subject at least when projection element pair 128 is in a closed position (see, e.g., FIG. 1C) and when projection element pair 128 is positioned at least partially in the opening (see, e.g., FIGS. 1 F and H) disposed in or between the one or more natural and/or prosthetic teeth 132 in the mouth of the given subject. As additionally shown, in this embodiment of handheld dental device 100, when first and second handle structures (102 and 106, respectively) are moved toward one another (see, e.g., FIG. 1E), first and second projection elements (122 and 112, respectively) of projection element pair 128 move away from one another (see, e.g., FIG. 1G) in directions that are substantially perpendicular to rotational axis 130 (see, e.g., FIG. 1F) of first and second handle structures (102 and 106, respectively) such that at least segments of projection element pair 128 contact the one or more natural and/or prosthetic teeth 132 in the mouth of the given subject when projection element pair 128 is positioned at least partially in the opening disposed in or between the one or more natural and/or prosthetic teeth 132 in the mouth of the given subject. At least a portion of handheld dental device 100 is typically dimensioned to at least partially fit within the mouth of the given subject.

In certain aspects, the present disclosure provides a handheld dental device (see, e.g., handheld dental device 100) that includes a first handle structure comprising a first rotational section and at least one operably connected first projection element, and a second handle structure comprising a second rotational section and at least one operably connected second projection element. In this embodiment of the handheld dental device, the first and second rotational sections are rotatably coupled to one another, and the first and second projection elements together form at least one projection element pair in which at least a portion of the projection element pair is dimensioned to fit at least partially within an opening disposed in or between one or more natural and/or prosthetic teeth in a mouth of a given subject when the projection element pair is in a closed position and when the projection element pair is positioned at least partially in the opening disposed in or between the one or more natural and/or prosthetic teeth in the mouth of the given subject. In this embodiment of the handheld dental device, when the first and second handle structures are moved toward one another, the first and second projection elements of the projection element pair move away from one another in directions that are substantially perpendicular to a rotational axis of the first and second handle structures such that at least segments of the projection element pair contact the one or more natural and/or prosthetic teeth in the mouth of the given subject when the projection element pair is positioned at least partially in the opening disposed in or between the one or more natural and/or prosthetic teeth in the mouth of the given subject. In this embodiment of the handheld dental device, at least a portion of the handheld dental device is dimensioned to at least partially fit within the mouth of the given subject.

In some embodiments of handheld dental device 100, first rotational section 104 of first handle structure 102 comprises orifice 134 disposed through at least a portion of first rotational section 104, which orifice 134 receives first portion 118 of post element 116. In some of these embodiments, first rotational section 104 of first handle structure 102 comprises post element receiving area 136 that is configured to receive at least first portion 118 of post element 116 and/or a modification of first portion 118 of post element 116 upon assembly of handheld dental device 100 (e.g., when post elements are structured as rivet-like components that are at least partially flattened and retained within post element receiving area 136 during device manufacture). In some of these embodiments, first rotational section 104 of first handle structure 102 comprises at least one fixation element receiving area 138. In some embodiments of handheld dental device 100, second rotational section 108 of second handle structure 106 comprises at least one rotational structure receiving area 140 that receives at least a portion of rotational structure 120 upon assembly of handheld dental device 100. In some embodiments of handheld dental device 100, second rotational section 108 of second handle structure 106 comprises at least one fixation element pass-through area 142. In some of these embodiments, post element 116 comprises at least one fixation element 144 that is passed through fixation element pass-through area 142 of second rotational section 108 of second handle structure 106 and at least partially into fixation element receiving area 138 of first rotational section 104 of first handle structure 102 during assembly of handheld dental device 100 such that post element 116 and first handle structure 102 are substantially fixedly positioned and substantially non-rotatable relative to one another.

Figure 2A:
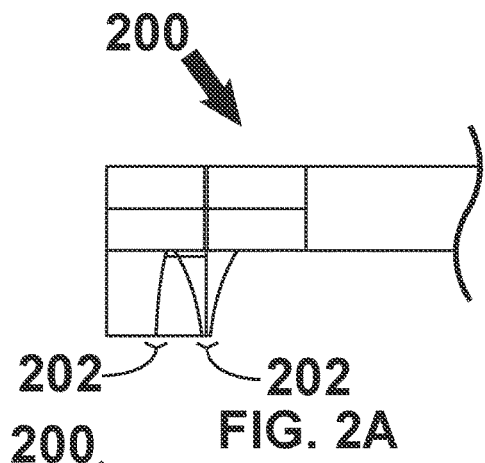
FIG. 2A schematically shows a portion of a handheld dental device that includes three projection element pairs from a detailed side view according to some aspects disclosed herein.

In some embodiments of the handheld dental devices disclosed herein, the post element and the first rotational section of the first handle structure are fabricated integral with one another. In some embodiments of the handheld dental devices disclosed herein, the post element and the rotational structure are fabricated integral with one another (see, e.g., post element 116 and rotational structure 120 in FIG. 1I). In some embodiments, the handheld dental devices disclosed herein include at least two projection element pairs (see, e.g., FIGS. 1D and 1O), whereas in other embodiments, the handheld dental devices include at least three projection element pairs. To illustrate, FIGS. 2A and B schematically shows a portion of handheld dental device 200 that includes three projection element pairs 202 from detailed side and detailed bottom views, respectively, according to some aspects disclosed herein.

Figure 3A:
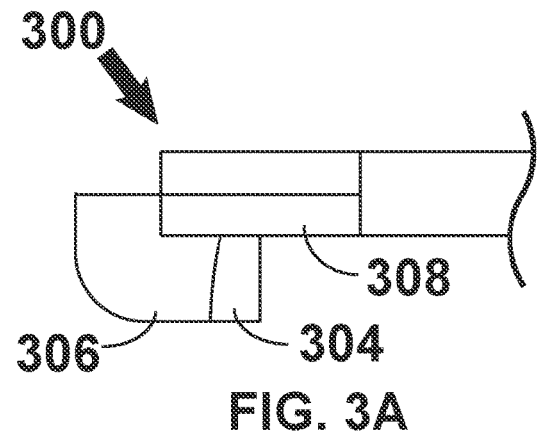
FIG. 3A schematically shows a portion of a handheld dental device that includes a single projection element pair that extends over multiple surfaces of a second rotational component from a detailed side view according to some aspects disclosed herein.
Figure 2B:
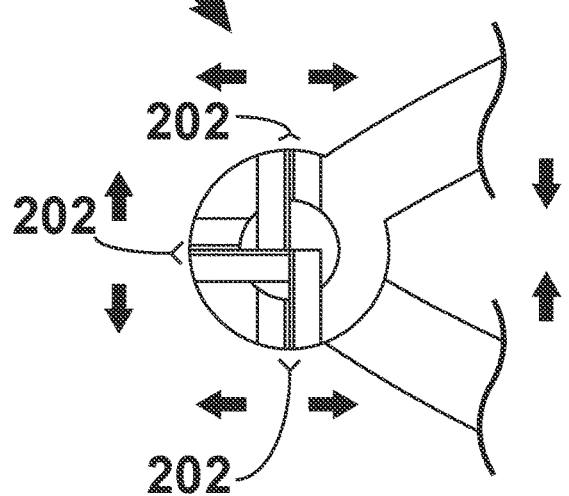
FIG. 2B schematically shows the portion of the handheld dental device that includes three projection element pairs from FIG. 2A from a detailed bottom view according to some aspects disclosed herein.
Figure 3B:
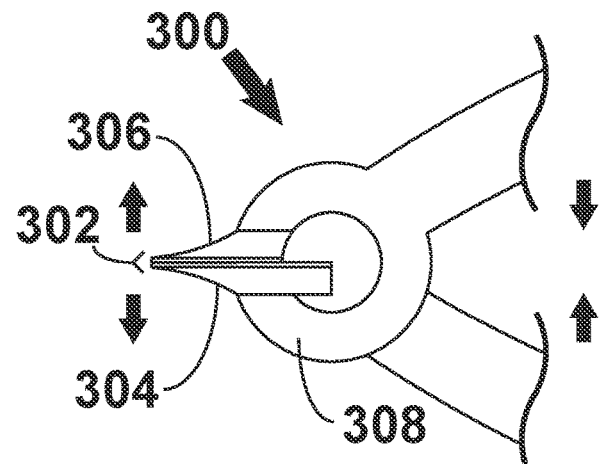
FIG. 3B schematically shows the portion of the handheld dental device that includes the single projection element pair from FIG. 3A from a detailed bottom view according to some aspects disclosed herein.

In some embodiments, handheld dental devices include projection element pairs that extend over multiple surfaces of the devices. To illustrate, FIGS. 3A and B schematically show a portion of handheld dental device 300 that includes a single projection element pair 302 that include first projection element 304 and second projection element 306, which extend over multiple surfaces of second rotational component 308 from detailed side and detailed bottom views, respectively, according to some aspects disclosed herein. While second projection element 306 is attached to the multiple surfaces of second rotational component 308, first projection element 304 is attached only to rotational structure 310 with clearance (not within view) over those surfaces of second rotational component 308 such when first projection element 304 and second projection element 306 move relative to one another first projection element 304 also moves relative to second rotational component 308.

In other exemplary embodiments, handle structures, post elements, and rotational structure are fabricated as separate components prior to handheld dental device assembly. To illustrate, FIG. 1M schematically shows first rotational section 103 of a first handle structure (partially within view), second rotational section 105 of a second handle structure (partially within view), post element 107, and separate rotational structure 109 of handheld dental device 101 from a detailed exploded and partially transparent side view prior to device. As also shown, second rotational section 105 includes fixation element pass-through area 111 through which post element 107 is disposed following device assembly and rotational structure receiving area 113 that rotatably receives rotational structure 109 following device assembly. Second rotational section 105 also includes second projection elements 115, while rotational structure 109 includes first projection elements 117. FIG. 1N schematically shows handheld dental device 101 from a detailed exploded and partially transparent side view following device assembly in which first rotational section 103, post element 107, and rotational structure 109 have been operably connected to one another (e.g., via a welding, bonding, or other process) such that those components are substantially fixedly positioned and substantially non-rotatable relative to one another and at least partially rotatable relative to second rotational section 105. As shown, one of the two formed projection element-pairs 119 is within view in FIG. 1N.

As a further illustration, FIG. 1O schematically shows a portion of a handheld dental device having two projection element pairs from a detailed bottom view according to some aspects disclosed herein. As shown, handheld dental device 150 is configured similar to handheld dental device 101 as shown in FIG. 1N, except that rotational structure 152, which is operably connected to first handle structure 154, includes first projection elements 156 that are attached to and extend from rotational structure 152 and, with clearance (not within view), over portions of second rotational section 158 of second handle structure 160. In this embodiment, second projection elements 162 that are attached to and extend from second rotational section 158 of second handle structure 160 and, with clearance (not within view), over portions of rotational structure 152.

Figure 5:
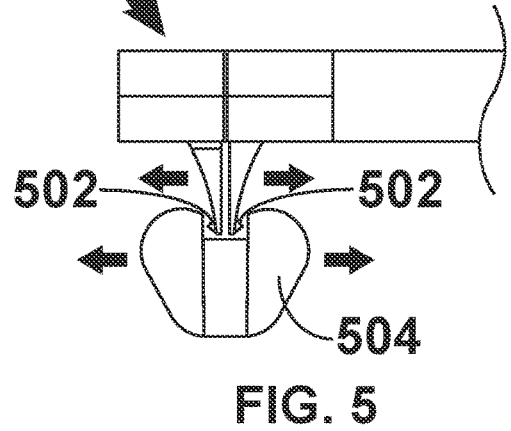
FIG. 5 schematically shows a portion of the handheld dental device that includes a projection element pair in which each projection element in the pair comprises a gripping element that is positioned within an opening of a crown from a detailed side view according to some aspects disclosed herein.

In some embodiments of the handheld dental devices disclosed herein, at least one of the first and second projection elements of the projection element pair comprises at least one gripping element that is structured to at least partially grip the one or more natural and/or prosthetic teeth in the mouth of the given subject when the segments of the projection element pair contact the one or more natural and/or prosthetic teeth in the mouth of the given subject. An example of this is illustrated in FIG. 5, which schematically shows a portion of handheld dental device 500 that includes a projection element pair in which each projection element in the pair comprises a gripping element 502 that is positioned within an opening of crown 504 from a detailed side view according to some aspects disclosed herein.

In some embodiments of the handheld dental devices disclosed herein, one or more portions of at least one of the first and second projection elements of the projection element pair extends over, and comprises clearance from, portions of one or more surfaces of the first and/or second rotational sections. An example of such clearance is shown, for example, with respect to handheld dental device 100 which includes clearance 127, which is shown as a space disposed between first projection element 122 and second rotational section 108 such that first projection element 122 can rotate over a portion of second rotational section 108, for example, when first handle structure 102 and second handle structure 106 are moved toward one another during a given dental procedure (see, e.g., FIG. 1C). Additional examples of such clearance are described further herein.

Figure 4:
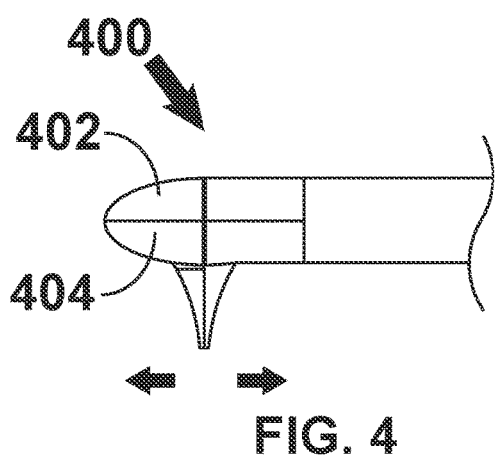
FIG. 4 schematically shows a portion of a handheld dental device that includes a first rotational section of a first handle structure and a second rotational section of a second handle structure that together comprise a partially elliptical cross-sectional shape from a detailed side view according to some aspects disclosed herein.

In some embodiments of the handheld dental devices disclosed herein, at least a part of at least one of the first and second projection elements of the projection element pairs disclosed herein comprises at least one cross-sectional shape selected from, for example, a circle, an ellipse, an oval, a square, an ellipse, a rectangle, a trapezoid, a triangle, an irregular n-sided polygon, and a regular n-sided polygon. In some embodiments of the handheld dental devices disclosed herein, at least a part of the first and second rotational sections together comprises at least one cross-sectional shape selected from, for example, a circle, an ellipse, an oval, a square, an ellipse, a rectangle, a trapezoid, a triangle, an irregular n-sided polygon, and a regular n-sided polygon. As an example, FIG. 4 schematically shows a portion of handheld dental device 400 that includes first rotational section 402 of a first handle structure and second rotational section 404 of a second handle structure that together comprise a partially elliptical cross-sectional shape from a detailed side view according to some aspects disclosed herein.

In some embodiments of the handheld dental devices disclosed herein, the first and/or second rotational section comprises at least one position indicator element that is structured to indicate a position of the projection element pair at least when the projection element pair are at least partially disposed within the mouth of the given subject. As shown, for example, handheld dental device 100 includes position indicator element 141 disposed on surfaces of first rotational section 104 and second rotational section 108 (see, e.g., FIG. 1H). Although not within view, position indicator element 141 extends over to a top surface of first rotational section 104.

Figure 6A:
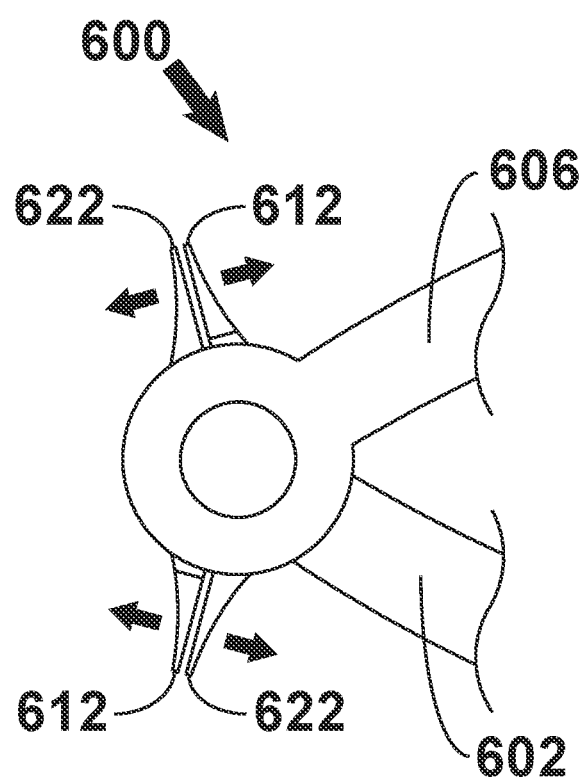
FIG. 6A schematically shows a portion of a handheld dental device that includes two projection element pairs that extend from sides of the handheld dental device from a detailed bottom view according to some aspects disclosed herein.
Figure 6B:
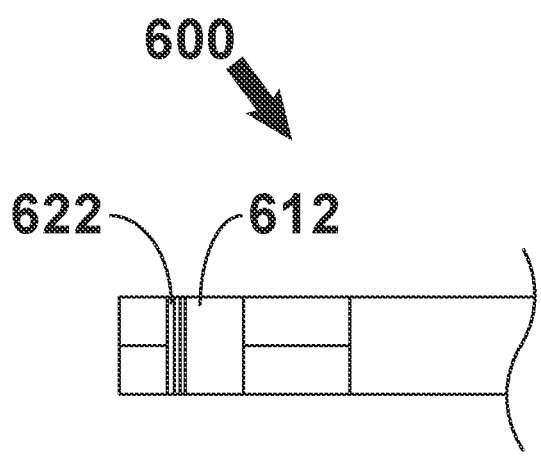
FIG. 6B schematically shows the portion of the handheld dental device that includes two projection element pairs from FIG. 6A from a detailed side view according to some aspects disclosed herein.
Figure 7A:
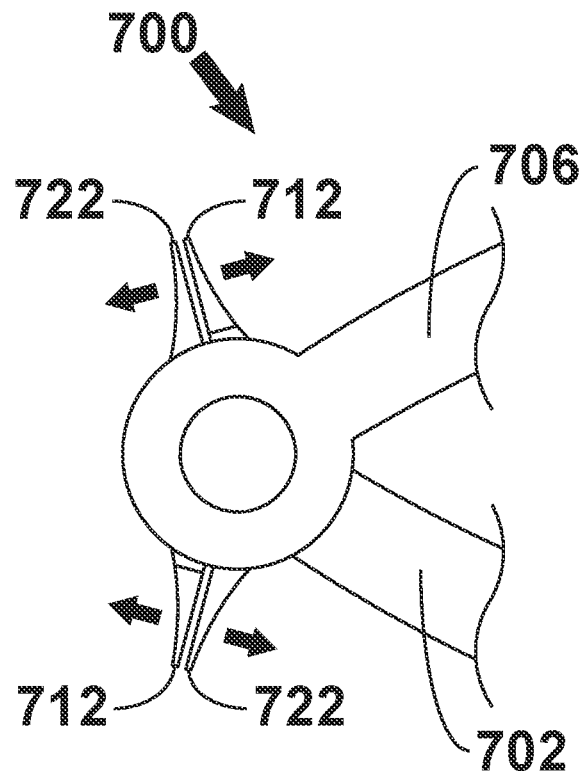
FIG. 7A schematically shows a portion of a handheld dental device that includes two projection element pairs that extend from sides of the handheld dental device from a detailed bottom view according to some aspects disclosed herein.
Figure 7B:
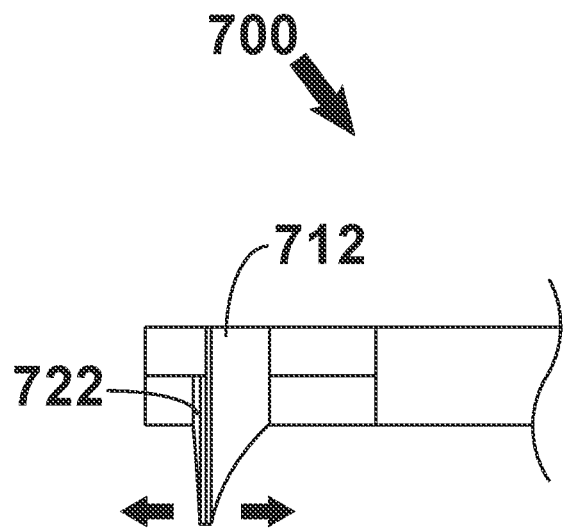
FIG. 7B schematically shows the portion of the handheld dental device that includes two projection element pairs from FIG. 7A from a detailed side view according to some aspects disclosed herein.
Figure 7C:
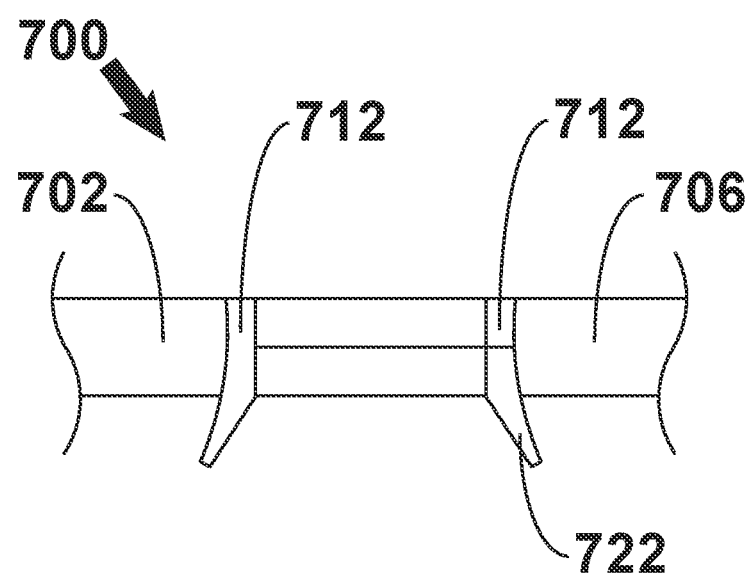
FIG. 7C schematically shows the portion of the handheld dental device that includes two projection element pairs from FIG. 7A from a detailed front view according to some aspects disclosed herein.

In some embodiments of the handheld dental devices disclosed herein, projection elements extend from sides of rotational sections of handle structures. To illustrate, FIGS. 6A and B schematically show a portion of handheld dental device 600 that includes two projection element pairs that extend from sides of handheld dental device 600 from detailed bottom and side views, respectively, according to some aspects disclosed herein. As shown, handheld dental device 600 includes two projection element pairs that each include a first projection element 612 and a second projection element 622. The first projection elements 612 extend from sides of a first rotational section of first handle structure 602, while second projection elements 622 extend from sides of a second rotational section of second handle structure 606. As also shown, first projection elements 612 have clearance relative to second rotational section of second handle structure 606. In some of these embodiments, at least a portion of a given projection element pair extends above and/or below a surface of the first and/or second rotational sections of a handheld dental device. To illustrate, FIGS. 7A-C schematically show a portion of handheld dental device 700 that includes two projection element pairs that extend from sides of handheld dental device 700 and below a rotational section of handheld dental device 700 from a detailed bottom, side, and front views, respectively, according to some aspects disclosed herein. As shown, handheld dental device 700 includes two projection element pairs that each include a first projection element 712 and a second projection element 722. The first projection elements 712 extend from sides of a first rotational section of first handle structure 702, while second projection elements 722 extend from sides of a second rotational section of second handle structure 706. As also shown, first projection elements 712 have clearance relative to second rotational section of second handle structure 706. In the embodiment shown, the two projection element pairs that extend below the second rotational section of second handle structure 706 of handheld dental device 700 and also extend outward (e.g., at an angle relative to the second rotational section) from the second rotational section of second handle structure 706 of handheld dental device 700, for example, to facilitate positioning at least one of the projection element pairs at least partially within an opening in or between one or more natural and/or prosthetic teeth in a mouth of a given subject. In some embodiments, projection element pairs do not extend outward from rotational sections of handle structures of handheld dental devices.

In some embodiments, the handheld dental devices disclosed herein include at least one resiliency element operably connected to the first and/or second handle structure, which resiliency element is structured to position the projection element pair in the closed position at least when the handheld dental device is not in use. To illustrate, handheld dental device 100 includes resiliency elements 143 operably connected to first handle structure 102 and second handle structure 106 (see, e.g., FIG. 1E). In some of these embodiments, the resiliency element is further structured to limit a range of motion at least of the first and second projection elements of the projection element pair (see, e.g., resiliency elements 143 of handheld dental device 100). In some embodiments, the handheld dental devices disclosed herein include at least one motion limiting element that is structured to limit a range of motion at least of the first and second projection elements of the projection element pair. In some of these embodiments, for example, a motion limiting element comprises corresponding male and female elements (e.g., a protrusion disposed within a corresponding cavity or channel) disposed in or extending from surfaces of first and second rotational sections that face one another in a given assembled handheld dental device which limit the movement of projection elements of the device as desired.

In other aspects, the present disclosure provides methods of administering dental therapy (e.g., removing a crown, extracting a tooth, or the like) to a subject. The methods typically include positioning at least one projection element pair of a handheld dental device as described herein at least partially within an opening disposed in or between one or more natural and/or prosthetic teeth in a mouth of the subject in which the projection element pair is substantially in a closed position. The methods also include moving the first and second handle structures of the handheld dental device toward one another such that the first and second projection elements of the projection element pair move away from one another in directions that are substantially perpendicular to a rotational axis of the first and second handle structures so that at least segments of the projection element pair contact and move at least a portion of at least one of the one or more natural and/or prosthetic teeth in the mouth of the subject, thereby administering the dental therapy to the subject.

Dental device components (e.g., handle structures, projection elements, resiliency elements, motion limiting elements, gripping elements, post elements, position indicator elements, rotational structures, etc.) are optionally formed by various fabrication techniques or combinations of such techniques including, e.g., cast molding, stamping, machining, embossing, extrusion, engraving, injection molding, etching (e.g., electrochemical etching, etc.), or other techniques. These and other suitable fabrication techniques are generally known in the art and described in, e.g., Molinari et al. (Eds.), Metal Cutting and High Speed Machining, Kluwer Academic Publishers (2002), Altintas, Manufacturing Automation: Metal Cutting Mechanics, Machine Tool Vibrations, and CNC Design, Cambridge University Press (2000), Stephenson et al., Metal Cutting Theory and Practice, Marcel Dekker (1997), Fundamentals of Injection Molding, W. J. T. Associates (2000), Whelan, Injection Molding of Thermoplastics Materials, Vol. 2, Chapman & Hall (1991), Rosato, Injection Molding Handbook, 3.sup.rd Ed., Kluwer Academic Publishers (2000), Fisher, Extrusion of Plastics, Halsted Press (1976), and Chung, Extrusion of Polymers: Theory and Practice, Hanser-Gardner Publications (2000), which are each incorporated by reference. Exemplary materials optionally used to fabricate device components include, e.g., metal (e.g., steel, aluminum, titanium, etc.), elastomers, glass, wood, polymethylmethacrylate, polyethylene, polydimethylsiloxane, polyetheretherketone, polytetrafluoroethylene, polystyrene, polyvinylchloride, polypropylene, polysulfone, polymethylpentene, and polycarbonate, among many others. In certain embodiments, following fabrication, device components are optionally further processed, e.g., by painting, coating surfaces with a hydrophilic coating, a hydrophobic coating, or the like.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, cranial implant devices, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A handheld dental device, comprising:
   a first handle structure comprising a first rotational section;
   a second handle structure comprising a second rotational section that comprises at least one orifice disposed through at least a portion of the second rotational section and one or more second projection elements that extend from at least one surface of the second rotational section;
   a post element disposed through the orifice of the second rotational section of the second handle structure, wherein at least a first portion of the post element is operably connected to the first rotational section of the first handle structure such that the post element and the first handle structure are substantially fixedly positioned and substantially non-rotatable relative to one another; and
   a rotational structure comprising one or more first projection elements that extend from at least one surface of the rotational structure, wherein at least a second portion of the post element is operably connected to the rotational structure such that the post element, the rotational structure, and the first handle structure are substantially fixedly positioned and substantially non-rotatable relative to one another,
   wherein at least a segment of the second rotational section of the second handle structure is disposed between at least a segment of the first rotational section of the first handle structure and at least a segment of the rotational structure such that the second handle structure is at least partially rotatable relative to the post element, the rotational structure, and the first handle structure,
   wherein the first and second projection elements together form at least one projection element pair, wherein at least a portion of the projection element pair is dimensioned to fit at least partially within an opening disposed in or between one or more natural and/or prosthetic teeth in a mouth of a given subject when the projection element pair is in a closed position and when the projection element pair is positioned at least partially in the opening disposed in or between the one or more natural and/or prosthetic teeth in the mouth of the given subject,
   wherein when the first and second handle structures are moved toward one another, the first and second projection elements of the projection element pair move away from one another in directions that are substantially perpendicular to a rotational axis of the first and second handle structures such that at least segments of the projection element pair contact the one or more natural and/or prosthetic teeth in the mouth of the given subject when the projection element pair is positioned at least partially in the opening disposed in or between the one or more natural and/or prosthetic teeth in the mouth of the given subject, and
   wherein at least a portion of the handheld dental device is dimensioned to at least partially fit within the mouth of the given subject.

2. The handheld dental device of claim 1, wherein the first rotational section of the first handle structure comprises at least one orifice disposed through at least a portion of the first rotational section, which orifice receives the first portion of the post element.

3. The handheld dental device of claim 1, wherein the first rotational section of the first handle structure comprises at least one post element receiving area that is configured to receive at least the first portion of the post element and/or a modification of the first portion of the post element upon assembly of the handheld dental device.

4. The handheld dental device of claim 1, wherein the first rotational section of the first handle structure comprises at least one fixation element receiving area.

5. The handheld dental device of claim 1, wherein the second rotational section of the second handle structure comprises at least one rotational structure receiving area that receives at least a portion of the rotational structure upon assembly of the handheld dental device.

6. The handheld dental device of claim 1, wherein the second rotational section of the second handle structure comprises at least one fixation element pass-through area.

7. The handheld dental device of claim 1, wherein the post element comprises at least one fixation element that is passed through the fixation element pass-through area of the second rotational section of the second handle structure and at least partially into the fixation element receiving area of the first rotational section of the first handle structure during assembly of the handheld dental device such that the post element and the first handle structure are substantially fixedly positioned and substantially non-rotatable relative to one another.

8. The handheld dental device of claim 1, wherein the post element and the first rotational section of the first handle structure are fabricated integral with one another.

9. The handheld dental device of claim 1, wherein the post element and the rotational structure are fabricated integral with one another.

10. The handheld dental device of claim 1, comprising at least two projection element pairs.

11. The handheld dental device of claim 1, comprising at least three projection element pairs.

12. The handheld dental device of claim 1, wherein at least one of the first and second projection elements of the projection element pair comprises at least one gripping element that is structured to at least partially grip the one or more natural and/or prosthetic teeth in the mouth of the given subject when the segments of the projection element pair contact the one or more natural and/or prosthetic teeth in the mouth of the given subject.

13. The handheld dental device of claim 1, wherein one or more portions of at least one of the first and second projection elements of the projection element pair extend over, and comprises clearance from, portions of one or more surfaces of the first and/or second rotational sections.

14. The handheld dental device of claim 1, wherein at least a part of at least one of the first and second projection elements of the projection element pair comprises at least one cross-sectional shape selected from the group consisting of: a circle, an ellipse, an oval, a square, a rectangle, a trapezoid, a triangle, an irregular n-sided polygon, and a regular n-sided polygon.

15. The handheld dental device of claim 1, wherein at least a part of the first and second rotational sections together comprises at least one cross-sectional shape selected from the group consisting of: a circle, an ellipse, an oval, a square, a rectangle, a trapezoid, a triangle, an irregular n-sided polygon, and a regular n-sided polygon.

16. The handheld dental device of claim 1, wherein the first and/or second rotational section comprises at least one position indicator element that is structured to indicate a position of the projection element pair at least when the projection element pair is at least partially disposed within the mouth of the given subject.

17. The handheld dental device of claim 1, comprising at least one motion limiting element that is structured to limit a range of motion at least of the first and second projection elements of the projection element pair.

18. The handheld dental device of claim 1, comprising at least one resiliency element operably connected to the first and/or second handle structure, which resiliency element is structured to position the projection element pair in the closed position at least when the handheld dental device is not in use.

19. The handheld dental device of claim 18, wherein the resiliency element is further structured to limit a range of motion at least of the first and second projection elements of the projection element pair.

\* \* \* \* \*